3,798,252
PROCESS FOR THE ADDITION OF SILICON COMPOUNDS WITH Si-BONDED HYDROGEN TO COMPOUNDS WITH ALIPHATIC MULTIPLE BONDS
Siegfried Nitzsche, Ignaz Bauer, Werner Graf, and Norbert Zeller, Burghausen, West Germany, assignor to Wacker-Chemie G.m.b.H., Munich, Germany
No Drawing. Filed June 22, 1972, Ser. No. 265,114
Claims priority, application Germany, June 25, 1971, P 21 31 741.9
Int. Cl. C07f 7/08, 7/18
U.S. Cl. 260—448.2 E                3 Claims

ABSTRACT OF THE DISCLOSURE

A process for the addition of silicon compounds with Si-bonded hydrogen to compounds with aliphatic multiple bonds in the presence of platinum catalysts which are obtained from the reaction of chloroplatinic acid and ketones.

---

The present invention relates to the use of compositions containing a particular type of platinum compounds as platinum catalysts in the addition of silicon compounds with Si-bonded hydrogen to compounds with aliphatic multiple bonds.

The addition of silicon compounds with Si-bonded hydrogen to compounds with aliphatic multiple bonds can be illustrated by the equation

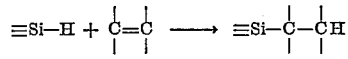

It has already been known for a relatively long time to promote this reaction by catalysts, especially platinum catalysts (compare, for example, German Auslegeschrift 1,069,148).

As compared to the previously known platinum catalysts including, for example, the reaction products of chloroplatinic acid and alcohols or aldehydes (compare German Auslegeschrift 1,257,752) or nitrile-platinum halide complexes (compare U.S. patent specification 3,410,886), the use of which for the addition described above has only been disclosed recently, the platinum catalysts used according to the invention in particular have the advantage of being more active. Furthermore, these catalysts are more easily available, for example since reduced pressure is not required for their manufacture and is also preferably not used, and/or because platinum compounds which are relatively easily obtainable are used for their manufacture and/or because they are obtained in higher yields. Finally, the catalyts used according to the invention are stable on storage for a longer period and are active for a longer period, and give constant results for a longer period, which is particularly very desirable in reactions carried out continuously.

The subject of the invention is a process for the addition of silicon compounds with Si-bonded hydrogen to compounds with aliphatic multiple bonds in the presence of platinum catalysts, characterized in that reaction products of chloroplatinic acid with ketones are used as platinum catalysts, in the form of solutions in which the solvent consists of the same ketone as has been employed for the manufacture of the reaction products, in at least 20 times the amount of the particular amount of chloroplatinic acid employed.

For the manufacture of the reaction products of chloroplatinic acid ($H_2PtCl_6 \cdot 6H_2O$) with ketones, which are used according to the invention, monoketones are preferably employed as the ketones, since they are more easily available, and in particular those which are free of aliphatic multiple bonds are appropriately employed. Examples of ketones which can be employed preferentially for the manufacture of the catalysts used according to the invention are thus cyclohexanone, methyl ethyl ketone, acetone, methyl n-propyl ketone, methyl iso-butyl ketone, methyl n-amyl ketone, diethyl ketone, ethyl n-butyl ketone, ethyl iso-amyl ketone, diisobutyl ketone and acetophenone. Appropriately, the ketones do not contain more than 15 carbon atoms so that they are liquid at the particular temperatures which prevail during the addition of the silicon compounds with Si-bonded hydrogen to the unsaturated compounds, and preferably they contain not fewer than 4 carbon atoms, so that they do not evaporate too rapidly. Particularly good results are obtained with cyclohexanone. The reaction products are appropriately manufactured by dissolving chloroplatinic acid in the particular ketone chosen and heating the solution thus obtained for 5 minutes to 15 hours, preferably 0.5 hour to 6 hours, to 60°–120° C. at the pressure of the surrounding atmosphere, that is to say at 760 mm. Hg (absolute) or about 760 mm. Hg (absolute), before this solution is brought into contact with silicon compounds with Si-bonded hydrogen and/or compounds with aliphatic multiple bonds. If desired, below-atmospheric or above-atmospheric pressure can be used for the catalyst preparation whilst heating, but because of the greater expense this is not preferred. Optionally, but not preferably, the heating during the preparation of the catalyst can also be replaced by leaving the solutions to stand at room temperature (about 18° to 25° C.) for at least 3 hours, appropriately at least 21 days, preferably with exclusion of light if they are left to stand for more than 24 hours. There is no upper limit to the duration of this period of standing. This limit is solely determined by economic considerations.

Proof that a sufficient amount of reaction products has formed can most easily be brought by mixing about 0.2 mg. of platinum in the form of, for example, 0.2 ml. of a solution manufactured by dissolving chloroplatinic acid in the ketone, after heating and leaving to cool at room temperature, or leaving to stand at room temperature, with a mixture of 0.05 mol of trichlorosilane and 0.05 mol of allyl chloride and ascertaining whether a significant temperature rise, for example of at least 2° C., occurs within about one minute. Such proof can, however, also be brought by other methods, for example observing the change in the infra-red spectrum.

Preferably, 100 to 2,000 parts by volume of ketone are employed per part by weight of chloroplatinic acid for the manufacture of the reaction products or catalyst solutions used according to the invention.

It is frequently desirable, but by no means always necessary, for example not always necessary when using the product as a catalyst in paper coating, to remove the water liberated during the reaction, or as a result of heating, from the solutions of the reaction products of chloroplatinic acid with ketones, for example by means of drying agents, such as anhydrous sodium sulphate, or already during heating, for example by means of a water trap mounted underneath the reflux condenser, before these solutions are brought into contact with silicon compounds with Si-bonded hydrogen and/or compounds with aliphatic multiple bonds.

The amounts of catalyst used within the framework of the process according to the invention can be the same as it has also bene possible to use hitherto in processes for the addition of silicon compounds with Si-bonded hydrogen to compounds with aliphatic multiple bonds in the presence of platinum catalysts. These amounts are mostly not less than $1 \cdot 10^{-8}$ mol, preferably $1 \cdot 10^{-7}$ to $1 \cdot 10^{-3}$ mol, of platinum, in each case calculated as chloroplatinic acid, per gram atom of Si-bonded hydrogen. It should however be pointed out that in the process according to the invention lower amounts of platinum catalysts are in general required than in previously known processes for the addition of silicon compounds with Si-bonded hydrogen to compounds with aliphatic multiple bonds in the presence of platinum catalysts, because of their higher activity and/or because of the greater persistence of their activity.

The process according to the invention can be employed wherever it is intended to add monomeric or polymeric silicon compounds with Si-bonded hydrogen to monomeric or polymeric compounds with aliphatic multiple bonds. In this addition reaction, other monomeric silicon compounds can be produced, depending on the choice of the compounds employed, such as, for example, in the manufacture of 3-chloropropyltrichlorosilane by reaction of trichlorosilane with allyl chloride, of n-propyltrichlorosilane by reaction of propene with trichlorosilane, or methacryloxypropyltrichlorosilane by reaction of allyl methacrylate with trichlorosilane, or of vinylmethyldichlorosilane by reaction of acetylene with methyldichlorosilane. In this reaction, dimeric or polymeric silicon-containing compounds can also be produced or modified, as, for example, in the reaction of vinyltrichlorosilane with trichlorosilane to give bis-1,2-trichlorosilylethane, or in the crosslinking, that is to say curing or vulcanization, of compositions, for example potting or coating compositions, based on organopolysiloxanes containing alkenyl groups, especially vinyl groups and Si-bonded hydrogen, or in processes for reducing the number of aliphatic multiple bonds in polymers, for example poly(oxyalkylene) polyols by reaction of polymers containing aliphatic multiple bonds with siloxanes which contain at least two Si-bonded hydrogen atoms per molecule.

The inert solvents or diluents which are frequently used conjointly in the addition of silicon compounds with Si-bonded hydrogen to compounds with aliphatic multiple bonds can also be used conjointly within the framework of the process according to the invention additionally to the ketones introduced by means of the catalyst solution into the mixture of the reactants and products.

In the examples which follow all parts and percent additions quoted are by weight, unless otherwise stated. The examples are intended to illustrate the invention without restricting it.

EXAMPLE 1

In order to illustrate that the catalysts used according to the invention are more active than previously known platinum catalysts for the addition of silicon compounds with Si-bonded hydrogen to compounds with aliphatic multiple bonds, the following experiments are carried out:

The amounts of platinum indicated in the following table, in the form of reaction products, used according to the invention, of chloroplatinic acid with a ketone, namely the catalysts (a), (b) and (c) and, for comparison, in the form of reaction products of chloroplatinic acid with octyl alcohol according to German Auslegeschrift 1,257,-752 ($V_1$) or in the form of a solution of $(C_6H_5CN)_2PtCl_2$ according to U.S.A. patent specification 3,410,886 ($V_2$) are added to mixtures of 0.05 mol of trichlorosilane and 0.05 mol of allyl chloride, which are contained in a glass vessel which is insulated against heat transfer.

Catalyst (a) was manufactured by allowing a solution of 1 g. of chloroplatinic acid in 200 ml. of cyclohexanone to stand over sodium sulphate at room temperature, with exclusion of light, for 4 months.

Catalyst (b) was manufactured by heating a solution of 1 g. of chloroplatinic acid in 200 ml. of cyclohexanone to 100° C. for 30 minutes and drying the resulting solution by means of anhydrous sodium sulphate.

Catalyst (c) was manufactured by heating a solution of 1 g. of chloroplatinic acid in 200 ml. of cyclohexanone to 100° C. for 1 hour and drying the solution thus obtained by means of anhydrous sodium sulphate.

After adding the catalysts, the rise in temperature, which results from the exothermic addition of trichlorosilane to allyl chloride and is to be viewed as a measure of the speed of this addition and hence of the activity of the catalyst, is observed. The following results are obtained:

TABLE

| Catalyst | Pt, mg. | Temperature in ° C. after— | | | | | | | | |
|---|---|---|---|---|---|---|---|---|---|---|
| | | 0 min. | 0.2 min. | 0.5 min. | 1 min. | 2 mins. | 4 mins. | 6 mins. | 8 mins. | 10 mins. |
| (a) | 0.2 | 24 | 30 | 34 | R | | | | | |
| (b) | 0.05 | 23.5 | (¹) | 24.3 | (¹) | 26.3 | 29.0 | 30 | (¹) | R |
| (c) | 0.05 | 23.5 | (¹) | 26.5 | 27.9 | 30.5 | R | | | |
| ($V_1$) | 0.3 | 24 | (¹) | 25.0 | 25.4 | 25.5 | (¹) | (¹) | (¹) | 25.5 |
| ($V_2$) | 0.8 | 24 | (¹) | (¹) | 24.2 | 24.6 | 26.5 | 28.5 | 31 | 33 |

¹ Not determined.

NOTE.—R=Reaction mixture boils.

EXAMPLE 2

A solution of 1 g. of chloroplatinic acid in 200 ml. of methyl ethyl ketone is heated under reflux for 10 hours whilst removing the water liberated through a trap connected to the reflux condenser. About 0.5 ml. of the catalyst solution thus obtained, corresponding to about 1 mg. of Pt, is added to 50 ml. of an equimolar mixture of vinyltrichlorosilane and trichlorosilane in a reaction vessel equipped with a reflux condenser and two dropping funnels. After a short time, a strong exothermic reaction commences. As soon as the reflux becomes weaker, further amounts of the equimolar mixture of vinyltrichlorosilane and trichlorosilane, as well as about 1 mg. of Pt in the form of the catalyst solution per 0.5 mol of vinyltrichlorosilane, are introduced dropwise into the reaction vessel at such speed that a moderate reflux is maintained without external heating. The yield of bis-1,2-trichlorosilylethane is practically quantitative.

EXAMPLE 3

A solution of 1 g. of chloroplatinic acid in 100 ml. of cyclohexanone is heated to 100° C. for 1 hour and is then dried by means of anhydrous sodium sulphate. About 7.5 ml. of the catalyst solution thus obtained, corresponding to about 30 mg. of Pt, are added to 500 g. of trichlorosilane in a 2 l. three-neck flask equipped with a thermometer, gas inlet tube and reflux condenser. Propene is then passed through the contents of the flask until the temperature of the contents of the flask, which has previously risen, drops because practically the entire amount of the trichlorosilane has been added to the propene to form n-propyltrichlorosilane. 1,500 g. of further trichlorosilane are added to this propyltrichlorosilane, which is still present in the mixture with the catalyst, and further propene is passed through the mixture. In the course thereof, the temperature rises again and the trichlorosilane is converted practically quantitatively. Thereafter, the catalyst is still active. This can be seen from the fact that the temperature of a sample of the reaction mixture again rises after mixing with further trichlorosilane and passing in propene.

EXAMPLE 4

A mixture of trichlorosilane and allyl chloride in the molar ratio of 1.1:1 is introduced simultaneously with 2 mg. of Pt in the form of the catalyst solution (c) according to Example 1 per mol of allyl chloride, into a 1 l. reaction vessel which is equipped with inlet leads, a thermometer and a stirrer and, at its lower part, with a lead provided with a stopcock, for withdrawing reaction mixture. As a result of the exothermic reaction, the mixture soon refluxes. The speed of addition of the abovementioned substances is regulated in such a way that the contents of the flask are kept at 60 to 65° C. As soon as about ⅔ of the reaction vessel is filled, the stopcock of the lead for withdrawing reaction mixture is opened and this reaction mixture is passed from below into a further 1 l. reaction vessel which is equipped with a thermometer and, at its upper end, with a lead for removing the reaction mixture. The flow from the first reaction vessel, and the flow of catalyst solution, are so regulated that a temperature of 73 to 76° C. becomes established in the second reaction vessel as a result of almost complete finishing of the reaction of the material coming from the first reaction vessel. When the stated temperatures have been reached, 900 ml./hour of the mixture of trichlorosilane and allyl chloride, in the molar ratio of 1.1:1, are introduced into the device described. The material issuing from the second reaction vessel has the following composition, according to analysis by gas chromatography:

78% of 3-chloropropyltrichlorosilane
12% of $SiCl_4$
2% of trichlorosilane
1% of allyl chloride
5% of propyltrichlorosilane the remainder being small amounts of propene and unidentified compounds.

EXAMPLE 5

The procedures described in Example 3 are repeated with the modification that ethylene is used in place of propene. Ethyltrichlorosilane is obtained in practically quantitative yield.

EXAMPLE 6

The procedures described in Example 3 are repeated with the modifications that methyldichlorosilane is used in place of trichlorosilane. n-Propylmethyldichlorosilane is obtained in practically quantitative yield.

EXAMPLE 7

The procedures described in Example 3 are repeated with the modifications that methyldichlorosilane is used in place of trichlorosilane and ethylene is used in place of propene. Ethylmethyldichlorosilane is obtained in practically quantitative yield.

EXAMPLE 8

0.1 mg. of Pt in the form of the catalyst solution (c) according to Example 1 is added to a mixture of 0.05 mol of trichlorosilane and 0.05 mol of pentene-(1). n-Pentyltrichlorosilane is obtained in practically quantitative yield, whilst the temperature of the mixture rises spontaneously.

EXAMPLE 9

The procedure described in Example 8 is carried out with methyldichlorosilane in place of trichlorosilane. n-Pentylmethyldichlorosilane is obtained in practically quantitative yield whilst the temperature of the mixture rises spontaneously.

EXAMPLE 10

1.25 l./hour of trichlorosilane are passed into an evaporator by means of a metering pump. The evaporated silane is mixed with 1.5 mols of acetylene, which has been dried over sulphuric acid, per mol of silane and is passed under a pressure of 0.4 atmosphere gauge, from below, through a perforated plate into a 1.5 m. high reaction tower of internally enameled steel. The capacity of the reaction tower is 7.5 l., of which 6 l. are filled by the disilylethane of the formula $(Cl_3SiCH_2)_2$, mixed with 10 ml. (20 mg. of platinum) of a solution which has been manufactured by dissolving 1 g. of chloroplatinic acid in 200 ml. of cyclohexanone, heating to 100° C. for one hour and drying the solution thus obtained by means of anhydrous sodium sulphate. Before introducing the reactants, the contents of the reaction tower are flushed with dry nitrogen and warmed by a jacket heater operated at 140° C. and regulated by a thermostat. As a result of this heating and of the heat of reaction, the contents of the tower are kept at 137 to 141° C. A pressure of 0.2 atmosphere gauge is set at the upper end of the interior of the reaction tower.

A vessel of 2 l. capacity and spherical shape is located at the upper end of the tower. From the lower quarter of this so-called defoaming globe, liquid material which enters this globe from the reaction tower is recycled through a pipeline into the reaction tower at the lower end, just above the perforated plate. The amount of disilylethane which exceeds the original amount of disilylethane introduced, namely 41.7 to 83.5 ml./hour, is withdrawn through a branch of this pipeline 20 cm. below the outlet of the globe. 5 cm. after the abovementioned branch, 4.37 ml./hour of the catalyst solution described above are introduced into this pipeline by means of a metering device. Above the defoaming globe there is a dephlegmator, from which disilylethane which has been carried away runs back into the deforming globe. The gaseous or vapour-form material which issues from the dephlegmator at a temperature of 58 to 60° C. is withdrawn through a condenser operated at —20° C. 1.46 to 1.54 l./hour of condensate are thereby obtained. According to analysis by gas chromatography, this condensate contains 93 to 97 percent by weight of vinyltrichlorosilane, 1 to 4 percent by weight of trichlorosilane and 1 to 3 percent by weight of 1,2-bis-trichlorosilylethane.

EXAMPLE 11

The procedure described in Example 10 is carried out in the apparatus described there, with the modification that instead of the mixture of the reactants described there, 1.67 l./hour of methyldichlorosilane and 2.2 mols of acetylene per mol of silane are employed, and instead of bis-trichlorosilylethane bis-methyldichlorosilylethane is employed. The contents of the reaction tower are kept at 141 to 142° C. by the heat of reaction and the jacket heater which is operated at 140° C. and regulated by a thermostat. The gaseous or vapor-form material issuing from the dephlegmator is at a temperature of 59 to 62° C. 1.87 to 1.92 l./hour of condensate are obtained from the condenser operated at —20° C. According to analysis by gas chromatography, this condensate contains 92 to 96 percent by weight of methylvinyldichlorosilane, 0.5 percent by weight of substances with a boiling point below that of methylvinyldichlorosilane and of unknown composition, and 3 to 7 percent by weight of bis-methyldichlorosilylethane. The amount of disilylethane withdrawn from the pipeline which issues from the defoaming globe is 83.5 to 106 ml./hour.

EXAMPLE 12

The procedure described in Example 10 is carried out in the apparatus described in Example 10, with the modifications that instead of the mixture of the reactants described there, 2 l./hour of 83 percent strength by weight dimethylchlorosilane and 1.8 mols of acetylene per mol of silane are employed, instead of bis-trichlorosilylethane bis-dimethylchlorosilylethane is employed and instead of 4.37 ml./hour 31.2 ml./hour of the catalyst solution described in Example 4 are employed, and also that the jacket heater is kept at 151 to 152° C. As a result of this heating and of the heat of the reaction, the contents of the reaction tower are kept at 147 to 149° C. The gaseous or vapor-form material issuing from the dephlegmator is at a temperature of 63 to 64° C. 2.08 l./hour of 74 percent strength by weight dimethylvinylchlorosilane are obtained from the condenser operated at —20° C. The amount of disilylethane withdrawn from the pipeline which issues from the defoaming globe is 125 to 240 ml./hour.

EXAMPLE 13

78 parts of a dimethylpolysiloxane possessing vinyldimethylsiloxy groups as terminal units, of viscosity 100,000 cp. at 25° C., are first . . . (not verb) with 12 parts of silicon dioxide produced pyrogenically in the gas phase, 7 parts of quartz powder and 3 parts of calcined and ground aluminium silicate and then with 3 parts of a copolymer of dimethylhydrogenosiloxane, methylhydrogenosiloxane and dimethylsiloxane units which has a viscosity of 2,500 cp. at 25° C. and possesses an average of 0.33 Si-bonded hydrogen atoms per Si atom. The mixture thus obtained is mixed with 0.4 part of the catalyst solution (c) according to Example 1 and warmed to 150° C. A non-tacky elastomer is obtained within 3 minutes.

For comparison, the procedure described above is repeated with the modification that instead of the catalyst (c) according to Example 1, the reaction product of chloroplatinic acid with octyl alcohol according to German Auslegeschrift 1,257,752 is used. In order again to obtain a non-tacky elastomer at 150° C. within 3 minutes, twice the amount of platinum is necessary.

EXAMPLE 14

Portions of 5 parts of a dimethylpolysiloxane possessing vinyldimethylsiloxy groups as terminal units, and of viscosity 150,000 cst. at 25° C., are first mixed with 0.7 part of methylhydrogenopolysiloxane end-blocked with trimethylsiloxy groups, of viscosity 50 cst. at 25° C., and then with such an amount of catalyst solution (a) according to Example 1 or catalyst solution (c) according to Example 1 or, for comparison, of a solution of the reaction product of chloroplatinic acid with octyl alcohol according to German Auslegeschrift 1,257,752, that the compositions in each case contain 440 parts per million (p.p.m.) of Pt. Portions of 5 parts of the compositions thus obtained are first dissolved in 10 parts of toluene and then diluted with 80 parts of an alkane mixture of boiling range 80 to 110° C. at 760 mm. Hg (absolute).

The solutions thus obtained are applied to glassyne paper and the coated paper is heated to 150° C. to produce non-sticking coatings.

The coatings from the solutions with the catalysts (a) and (c) according to Example 1 are cured after 1 to 2 minutes and this speed of curing remains the same if the catalyst solutions have been stored for 60 days at room temperature before mixing with the organopolysiloxanes. On the other hand, the coatings from the comparison composition are only cured after 4 to 4 (sic!!) minutes. After only 10 days' storage of the solution of the reaction product of chloroplatinic acid according to German Auslegeschrift 1, 257,752 in octyl alcohol at room temperature, before mixing with the organopolysiloxanes, curing no longer occurs.

We claim:

1. An improved process for the preparation of silicon compounds by the addition of silicon compounds having Si-bonded hydrogen to compounds having aliphatic multiple bonds in the presence of platinum catalysts, the improvement which comprises carrying out said addition reaction in the presence of an effective amount of a catalytic solution obtained from the reaction of chloroplatinic acid and a monoketone having up to 15 carbon atoms in which the solvent is present in an amount of at least 20 times the amount of chloroplatinic acid and consists of the same ketone as used in the preparation of the catalyst solution.

2. The improved process of claim 1, in which the platinum catalysts have been prepared by dissolving chloroplatinic acid in the ketone and thereafter heating the solution thus obtained to 60–120° C. for 0.5 to 6 hours.

3. The improved process of claim 1 in which cyclohexanone is used as the ketone.

References Cited

UNITED STATES PATENTS

| | | | |
|---|---|---|---|
| 3,470,225 | 9/1969 | Knorre et al. | 260—448.2 E |
| 3,624,119 | 11/1971 | Rothe et al. | 260—448.2 E |
| 3,057,902 | 10/1962 | Pike | 260—448.2 E |
| 3,220,972 | 11/1965 | Lamoreaux | 260—448.2 E X |

DANIEL E. WYMAN, Primary Examiner

P. E. SHAVER, Assistant Examiner

U.S. Cl. X.R.

260—448.8 R